(12) United States Patent
Nozawa et al.

(10) Patent No.: US 8,043,541 B2
(45) Date of Patent: Oct. 25, 2011

(54) SYSTEMS AND METHODS OF INSTALLING HOOK FASTENER ELEMENTS IN A MOLD ASSEMBLY

(75) Inventors: Yasutoshi Nozawa, Macon, GA (US); Thanh P. Nguyen, Novi, MI (US)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 12/353,538

(22) Filed: Jan. 14, 2009

(65) Prior Publication Data

US 2010/0176538 A1 Jul. 15, 2010

(51) Int. Cl.
*B29D 7/00* (2006.01)
(52) U.S. Cl. .................. 264/215; 264/214; 425/112
(58) Field of Classification Search .............. 264/214, 264/215; 425/112; *B29D 7/00*
See application file for complete search history.

(56) References Cited

U.S. PATENT DOCUMENTS

| | | | | |
|---|---|---|---|---|
| 1,628,836 | A | * | 5/1927 | Gammeter ................. 156/501 |
| 1,639,312 | A | | 8/1927 | Schrock |
| 1,783,232 | A | | 12/1930 | Finn |
| 1,924,569 | A | * | 8/1933 | Roseman .................... 112/106 |
| 3,020,613 | A | | 2/1962 | Morin |
| 3,390,680 | A | | 7/1968 | Marcum |
| 3,392,497 | A | * | 7/1968 | Cushman ..................... 52/272 |
| 3,717,908 | A | | 2/1973 | Perina |
| 4,651,355 | A | * | 3/1987 | White ............................. 2/247 |
| 4,673,542 | A | * | 6/1987 | Wigner et al. ............... 264/46.7 |
| 5,061,540 | A | * | 10/1991 | Cripps et al. ................. 428/100 |
| 5,286,431 | A | * | 2/1994 | Banfield et al. .............. 264/134 |
| 5,744,080 | A | | 4/1998 | Kennedy et al. |
| 5,766,723 | A | | 6/1998 | Oborny et al. |
| 6,235,369 | B1 | * | 5/2001 | Shepard et al. ................. 428/85 |
| 6,537,643 | B1 | | 3/2003 | Poulakis |
| 6,656,563 | B1 | | 12/2003 | Leach et al. |
| 6,803,010 | B2 | | 10/2004 | Leach et al. |
| 2002/0164451 | A1 | | 11/2002 | Fujisawa et al. |
| 2003/0197414 | A1 | | 10/2003 | Fleuchaus et al. |

(Continued)

FOREIGN PATENT DOCUMENTS

EP  1 300 299  4/2003

(Continued)

OTHER PUBLICATIONS

U.S. Appl. No. 12/133,572, filed Jun. 5, 2008, entitled *Flexible Fastener Strip Assembly and Methods of Assembling the Same.*

(Continued)

*Primary Examiner* — Joseph Del Sole
*Assistant Examiner* — David N Brown, II
(74) *Attorney, Agent, or Firm* — Alston & Bird LLP

(57) ABSTRACT

Various embodiments of a mold assembly system include a mold defining at least one trench along a surface of the mold and two or more hook fastener elements disposed on the surface of the trench in an end-to-end relationship. Each hook fastener elements includes: (1) an elongated base, (2) a plurality of hooks extending upwardly from an upper surface of the base, and (3) a magnetic material disposed within the base. The hook fastener elements are unattached to each other and are separately disposed within the trench, and the magnetic portion of the trench is configured to attract the hook fastener elements toward the magnetic portion and hold the hook fastener elements adjacent thereto in an end-to-end relationship substantially along the length of the trench. In one embodiment, the hook fastener elements are substantially the same length and are usable in straight trenches, curved trenches, or trenches having various lengths.

10 Claims, 10 Drawing Sheets

U.S. PATENT DOCUMENTS

2005/0264642 A1* 12/2005 Tischer et al. ................ 347/213
2007/0240289 A1 10/2007 Murasaki et al.

FOREIGN PATENT DOCUMENTS

| JP | 2788564 B2 | 6/1998 |
| JP | 2003 011137 | 1/2006 |
| JP | 2006 205641 | 8/2006 |

OTHER PUBLICATIONS

Partial European Search Report dated May 6, 2010 for Application No. 09262925.4.
Office Action dated Dec. 20, 2010, U.S. Appl. No. 12/355,933.
Search Report dated Feb. 23, 2011, European Application No. 09252925.4.

* cited by examiner

SYSTEMS AND METHODS OF INSTALLING HOOK FASTENER ELEMENTS IN A MOLD ASSEMBLY

BACKGROUND OF THE INVENTION

Hook and loop fastening structures may be used in various applications to secure objects adjacent each other. For example, hook fastening strips may be molded onto a surface of a foam bun of an automobile seat, and loop material may be provided on an inner surface of an automobile seat covering to engage the hook fastening strips and secure the seat covering to the foam bun. Flexible hook fastening strips may be utilized adjacent portions of the foam bun having contours, and straight hook fastening strips may be utilized on straight portions of the foam bun, such as longitudinally down the center of the bun.

FIG. 1 illustrates an embodiment of a mold 10 for forming the foam bun of a particular automobile seat. The mold 10 includes trenches 12, 13 for receiving the hook fastening strips 21, 22, respectively, prior to injection of the foam for forming the foam bun. An operator disposes a straight hook fastening strip 22 within a straight trench 13 and a flexible hook fastening strip 21 within each curved trench 12. To hold the hook fastening strips 21, 22 in the trenches 12, 13 and to align each strip 21, 22 properly within each trench 12, 13, the trenches 12, 13 may include a magnetic surface and the hook fastening strips 21, 22 may include a monofilament having magnetic properties (e.g., carbon steel or iron) formed within the fastening strips 21, 22.

Prior art flexible hook fastener strips such as the fastener strips 21 shown in FIGS. 1 and 2A-2D are die cut into the shape and length of the trench 12, which limits the fastener strips to use only with trenches having that particular shape and length. In addition, a covering 23 is disposed over the hooks to prevent foam from seeping between the hooks. However, an operator has to remove this covering 23 from a base 24 on which the hooks are disposed after removing the formed foam bun from the mold 10, which results in an extra manufacturing step for the operator and wasted material for the manufacturer. Furthermore, the known fastener strips 21 are flimsy, making them difficult for the operator to manipulate when disposing them within the trenches 12.

Straight fastener strips 22, such as those disclosed in U.S. Published Patent Application Number 2007/0240289 and shown in FIG. 3, provide a sufficient level of stiffness in a plane perpendicular to an upper surface of the fastener strips 22, but these fastener strips 22 lack flexibility in a plane containing the upper surface of the fastener strips 22. Accordingly, these strips 22 can only be used in substantially straight trenches. In addition, these length of these strips 22 are cut (or formed) to be substantially the length of the trench in which the strip 22 is to be disposed. Accordingly, manufacturers that use the strips 22 have to stock different length strips 22 for use in trenches having different lengths.

The Assignee of this application also has developed another type of fastener strip assembly 25, as shown in FIG. 4, which includes a plurality of straight fastener strips 28 that are joined together in an end-to-end relationship by an elongated connecting member 29. Like the known fastener strips described above, the fastener strip assembly 25 according to various embodiments has a total length that is substantially the length of the trench in which the fastener strip assembly 25 is to be disposed. Thus, fastener strip assemblies 25 having varying lengths are assembled to accommodate trenches having varying lengths. Furthermore, the fastener strips 28 used in the fastener strip assembly 25 are cut to varying lengths to accommodate fastener strip assemblies 25 to be used in trenches having varying radii of contour. For example, for trenches having a greater radius of contour, the fastener strips 28 used in the fastener strip assembly 25 have a shorter length to allow the fastener strip assembly 25 to follow the contour. Similarly, for trenches having a lesser radius of contour or straight trenches, the fastener strips 28 used in the fastener strip assembly 25 can have a longer length. Thus, this arrangement results in the need to assemble fastener strip assemblies 25 using fastener strips 28 having different lengths and to assemble fastener strip assemblies 25 having different overall lengths to accommodate various trench lengths and curvatures.

Thus, a need in the art exists for an improved system and method for installing hook fastener strips within straight and curved trenches of a mold assembly and provides for increased efficiency in the manufacturing and installation process.

BRIEF SUMMARY OF VARIOUS EMBODIMENTS OF THE INVENTION

Various embodiments of a mold assembly system include a mold defining at least one trench along a surface of the mold and two or more hook fastener elements disposed on the surface of the trench in an end-to-end relationship. Each hook fastener element includes: (1) an elongated base, (2) a plurality of hooks extending upwardly from an upper surface of the base, and (3) a magnetic material disposed within the base. The hook fastener elements are unattached to each other and are separately disposed within the trench, and the magnetic portion of the trench is configured to attract the hook fastener elements toward the magnetic portion, align the hook fastener elements, and hold the hook fastener elements adjacent thereto in an end-to-end relationship substantially along the length of the trench. In one embodiment, the hook fastener elements are substantially the same length and are usable in straight trenches, curved trenches, or trenches having various lengths.

BRIEF DESCRIPTION OF THE DRAWINGS

Figure 1:
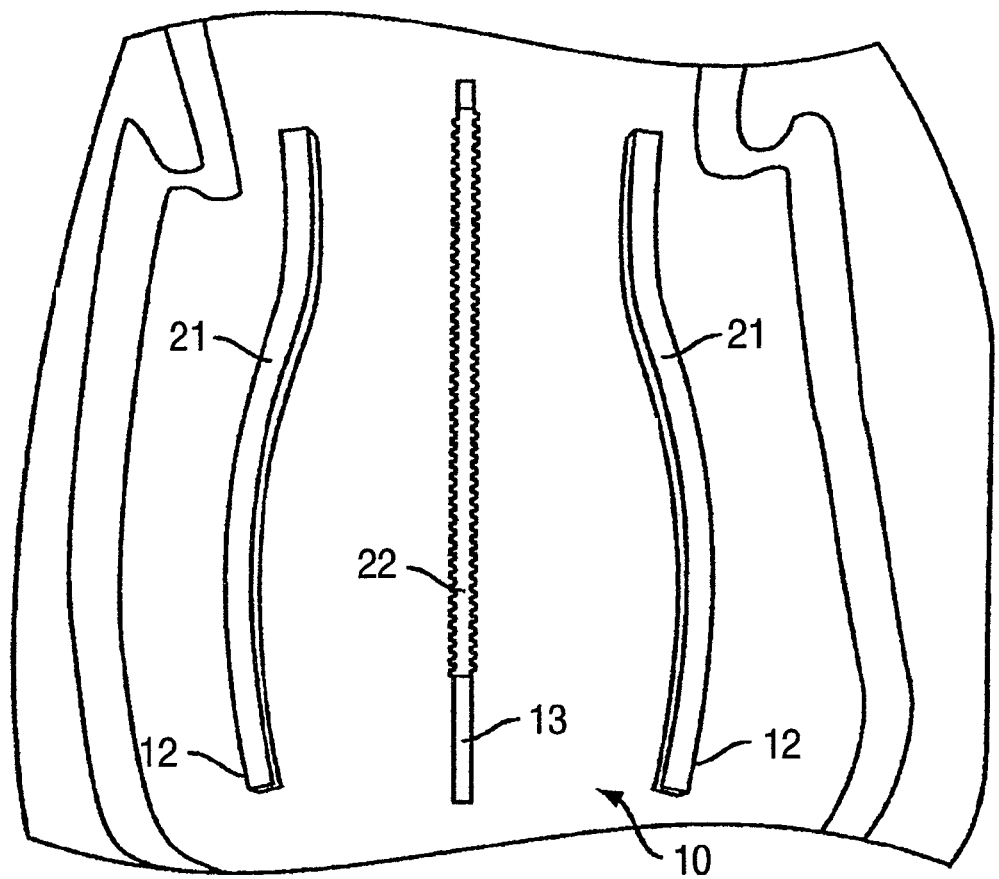

Having thus described various embodiments of the invention in general terms, reference will now be made to the accompanying drawings, which are not necessarily drawn to scale, and wherein:

FIG. 1 illustrates a view of a mold assembly for forming a foam bun.

Figure 2B:
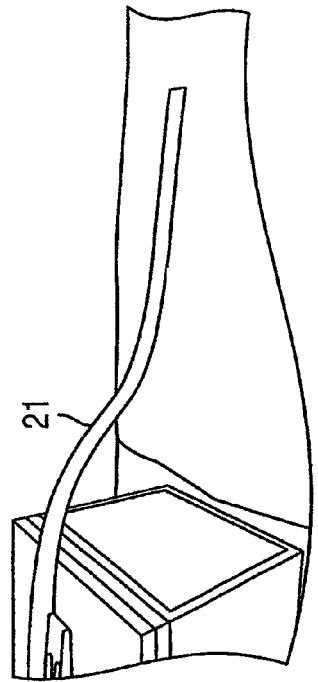
Figure 2D:
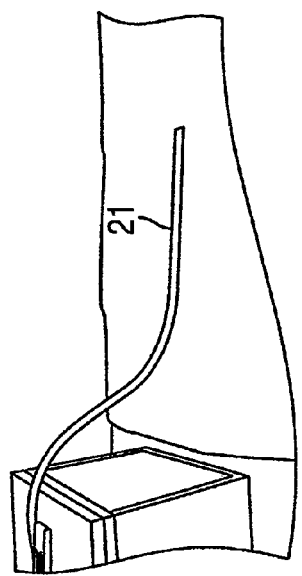
Figure 2A:
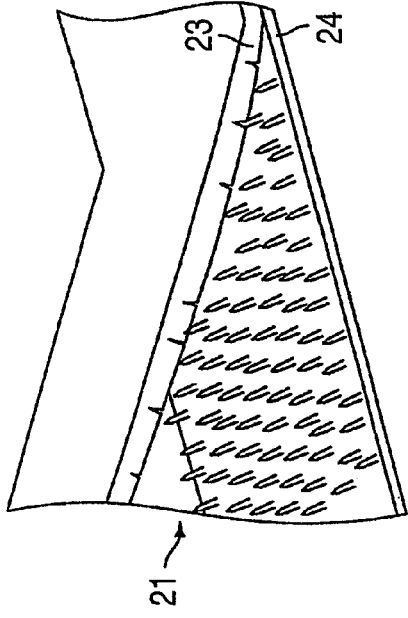

FIGS. 2A and 2B illustrate a known flexible fastener strip.

Figure 2C:
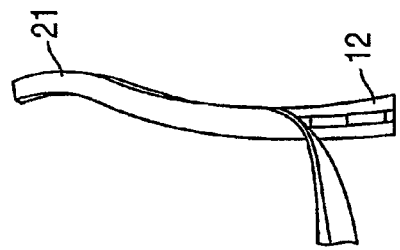

FIGS. 2C and 2D illustrate stiffness and flexibility qualities of the flexible fastener strip shown in FIGS. 2A and 2B.

Figure 3:
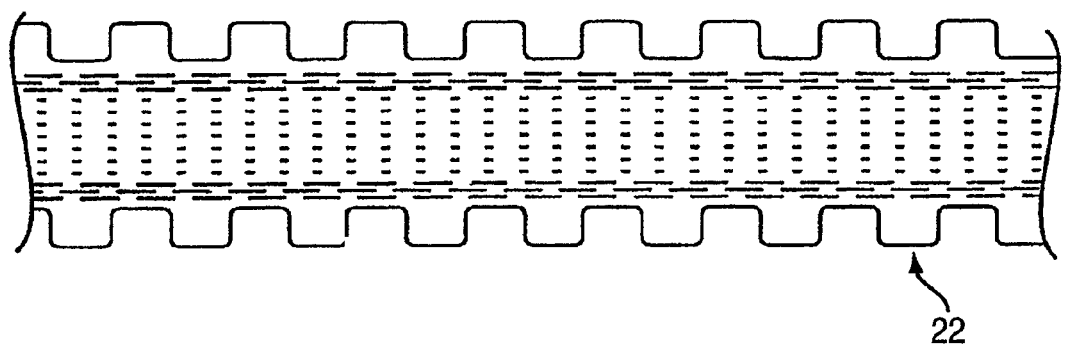

FIG. 3 illustrates a known straight fastener strip.

Figure 4:
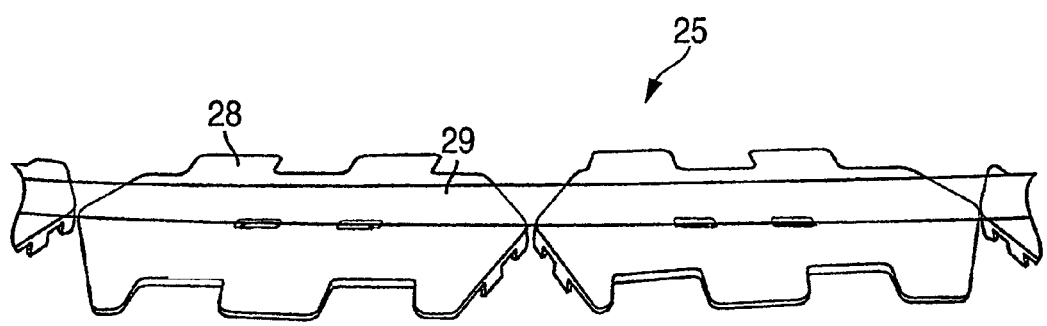

FIG. 4 illustrates a bottom perspective view of a known fastener strip assembly.

Figure 5:
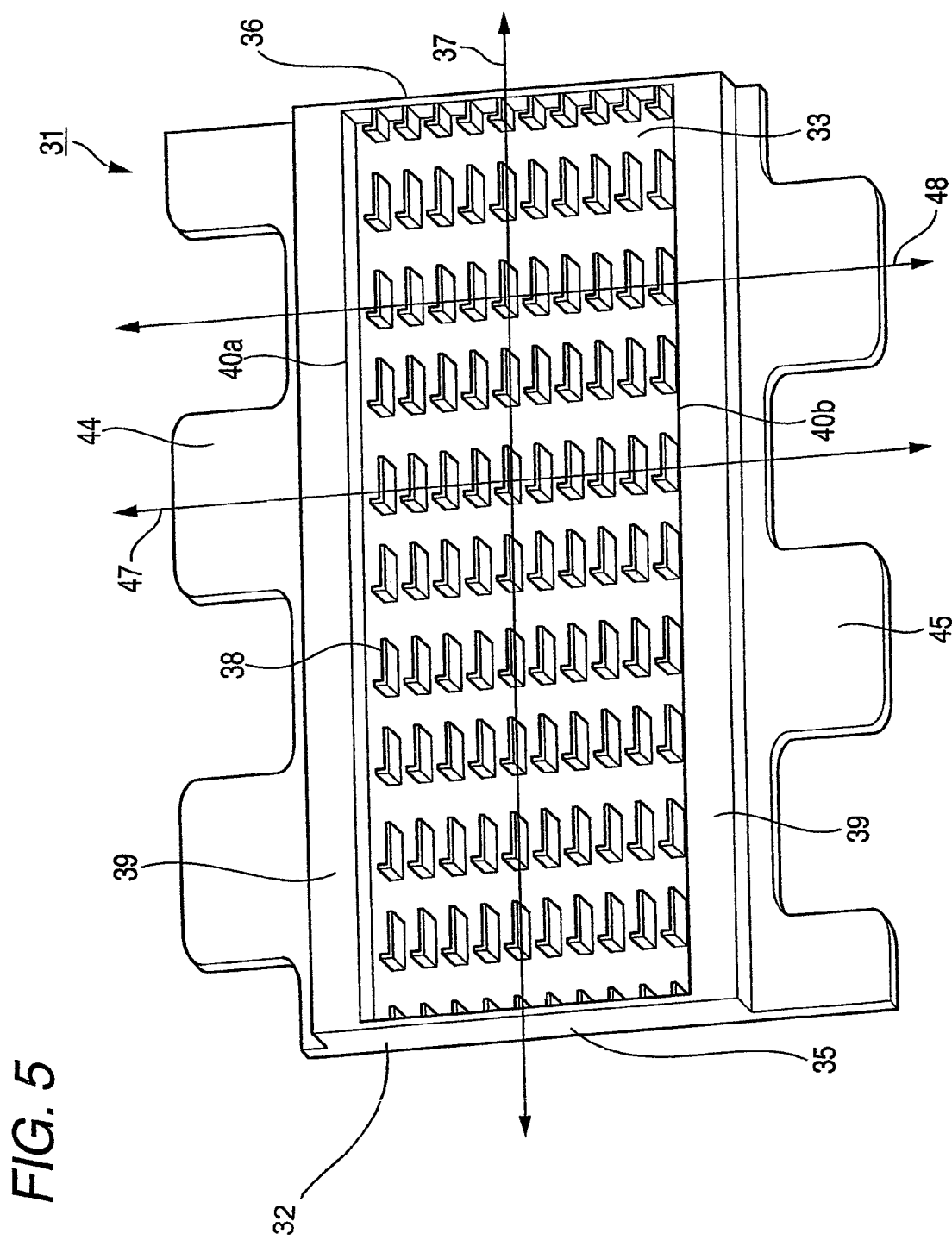

FIG. 5 illustrates a perspective view of an upper surface of a hook fastener element according to various embodiments of the invention.

Figure 6:
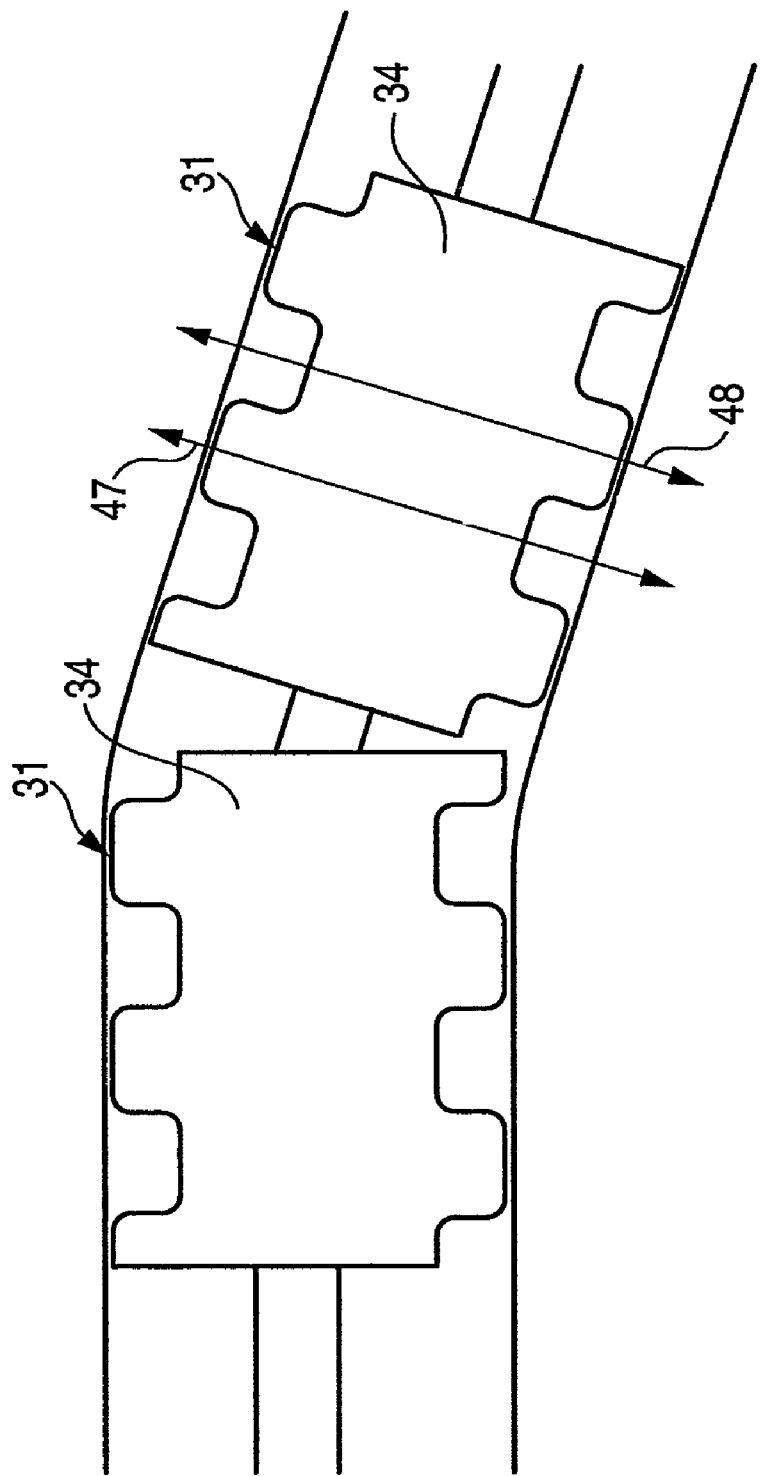

FIG. 6 illustrates a perspective view of lower surfaces of two hook fastener elements shown in FIG. 5 disposed on a magnetic surface of a trench according to one embodiment of the invention.

Figure 7:
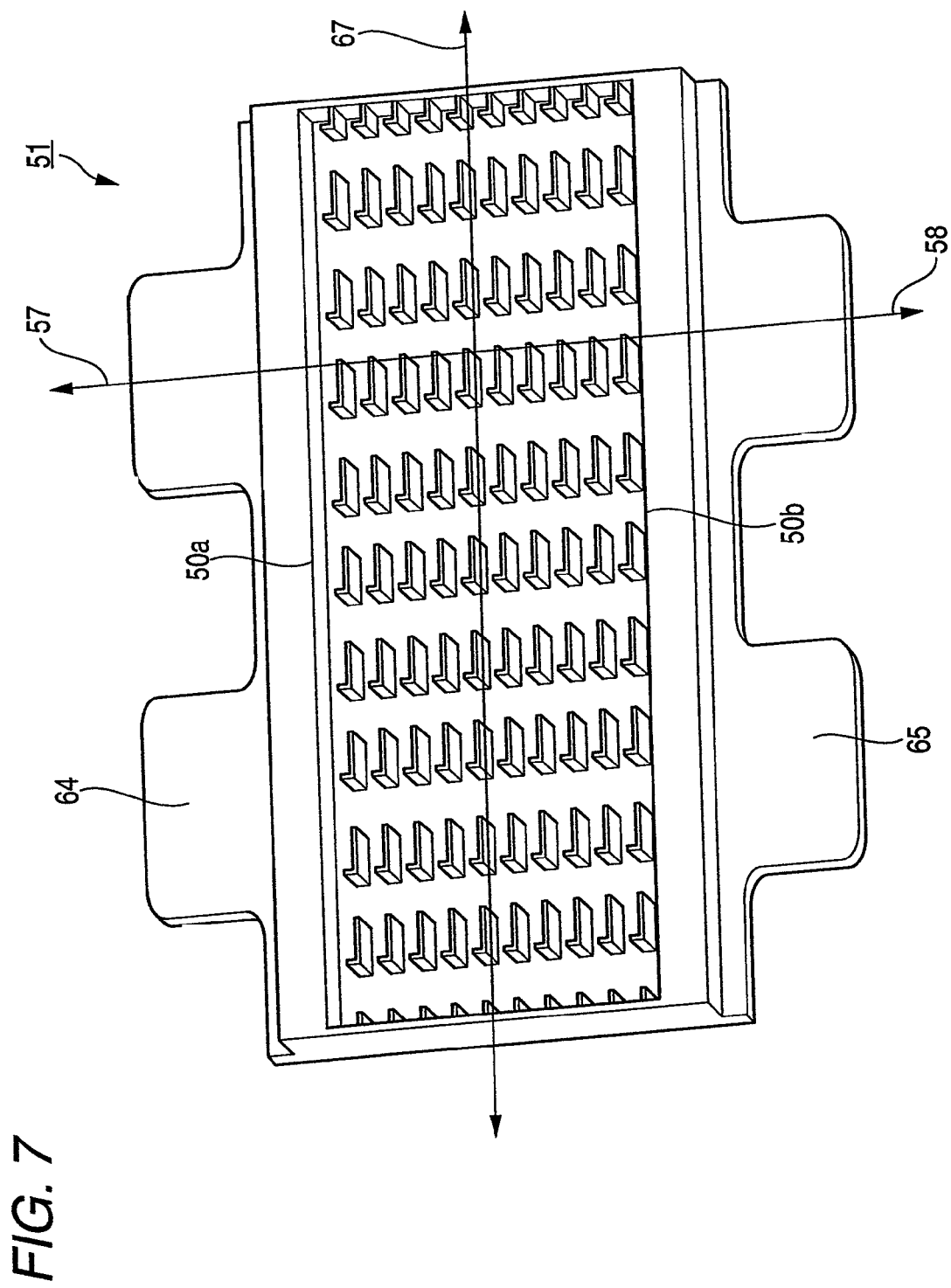

FIG. 7 illustrates a perspective view of an upper surface of a hook fastener element according to an alternative embodiment of the invention.

Figure 8:
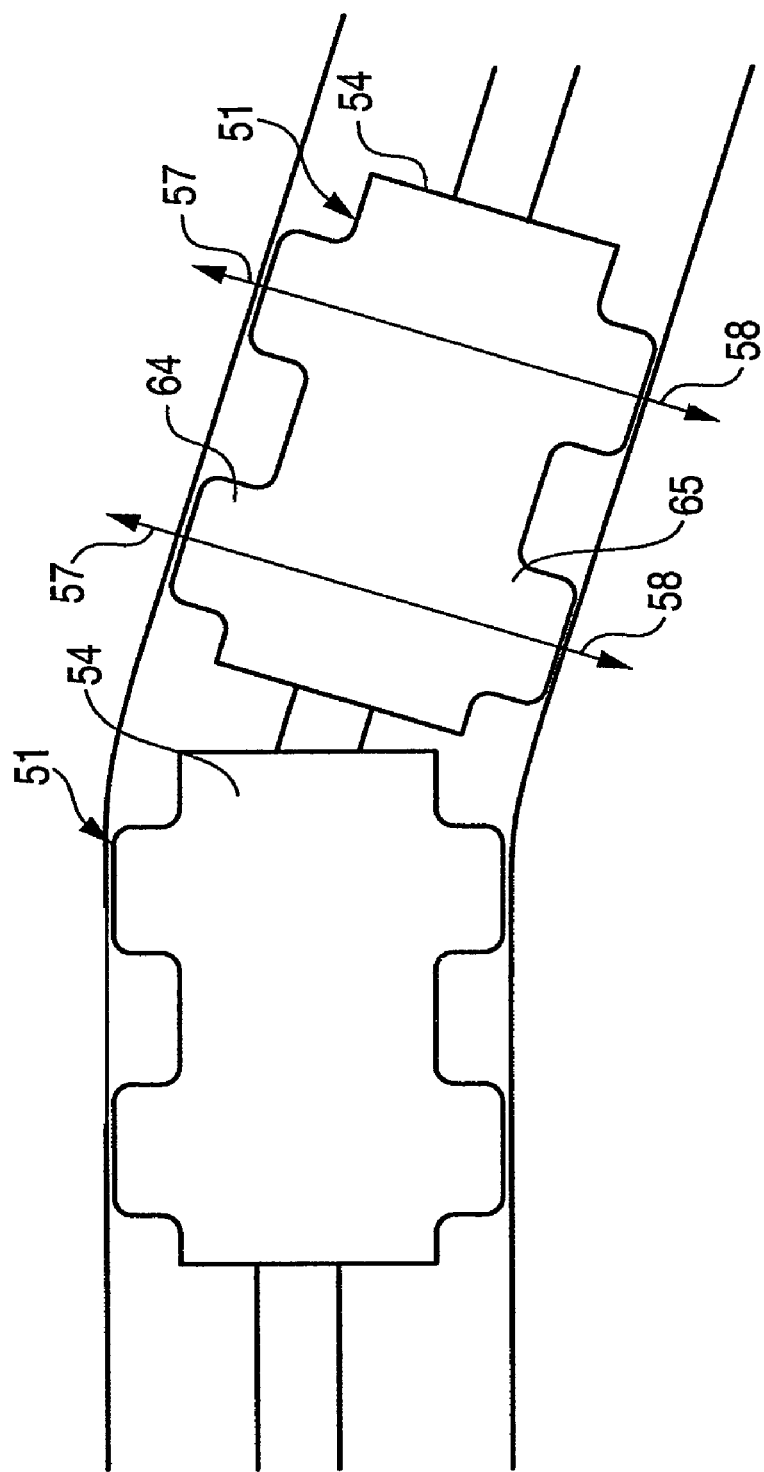

FIG. 8 illustrates a perspective view of lower surfaces of two hook fastener elements shown in FIG. 7 disposed on a magnetic surface of a trench according to an alternative embodiment of the invention.

Figure 9:
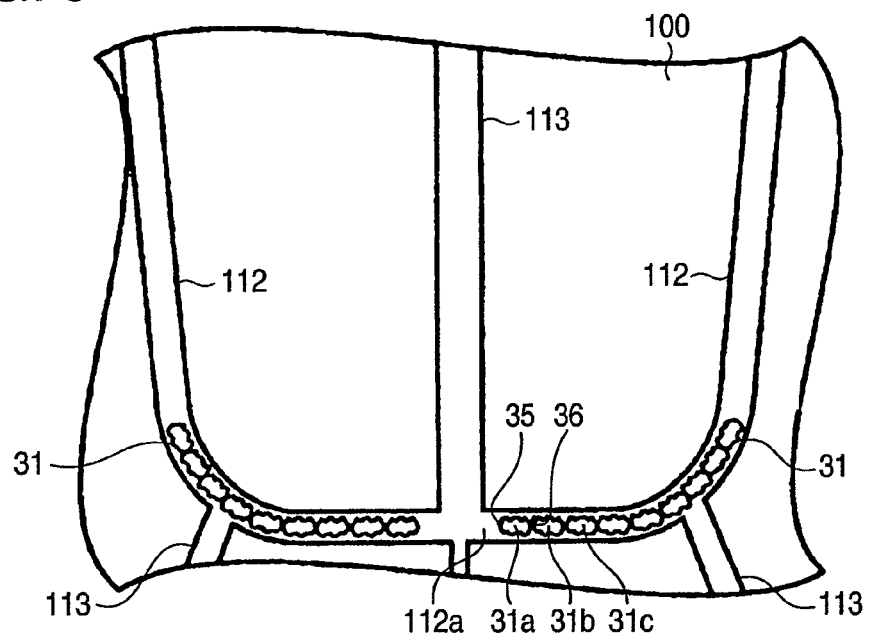

FIG. 9 illustrates a partial plan view of a mold assembly according to one embodiment.

Figure 10:
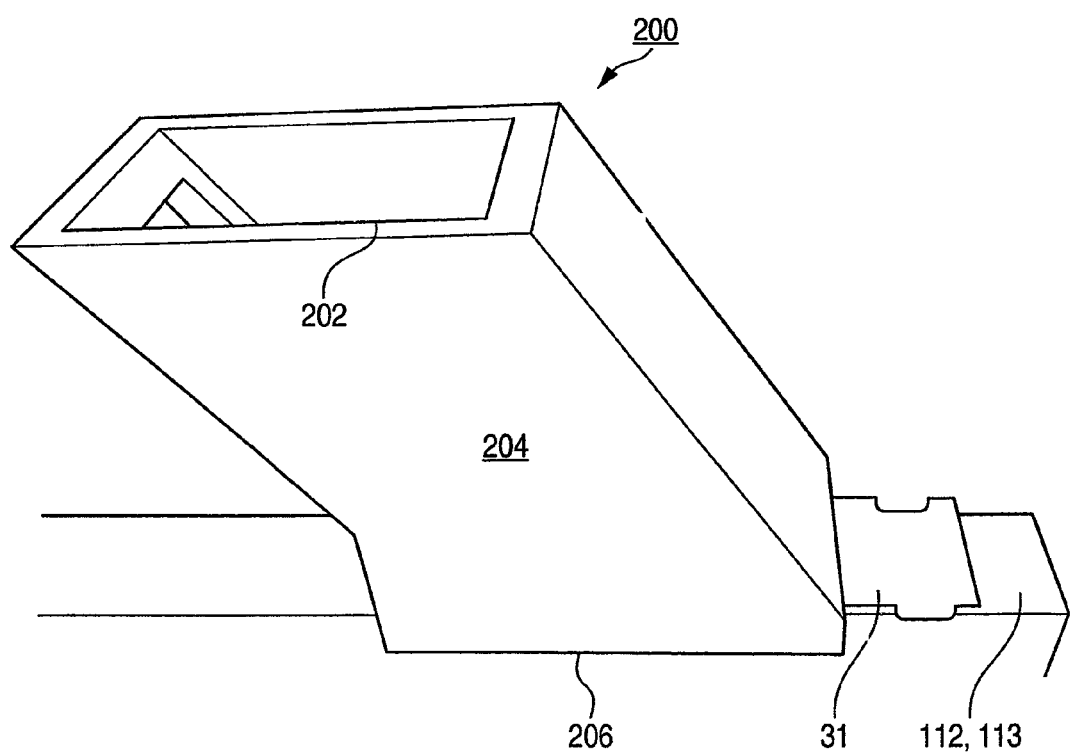

FIG. 10 illustrates a dispensing apparatus for dispensing the hook fastener elements into a mold assembly according to one embodiment of the invention.

Figure 11:
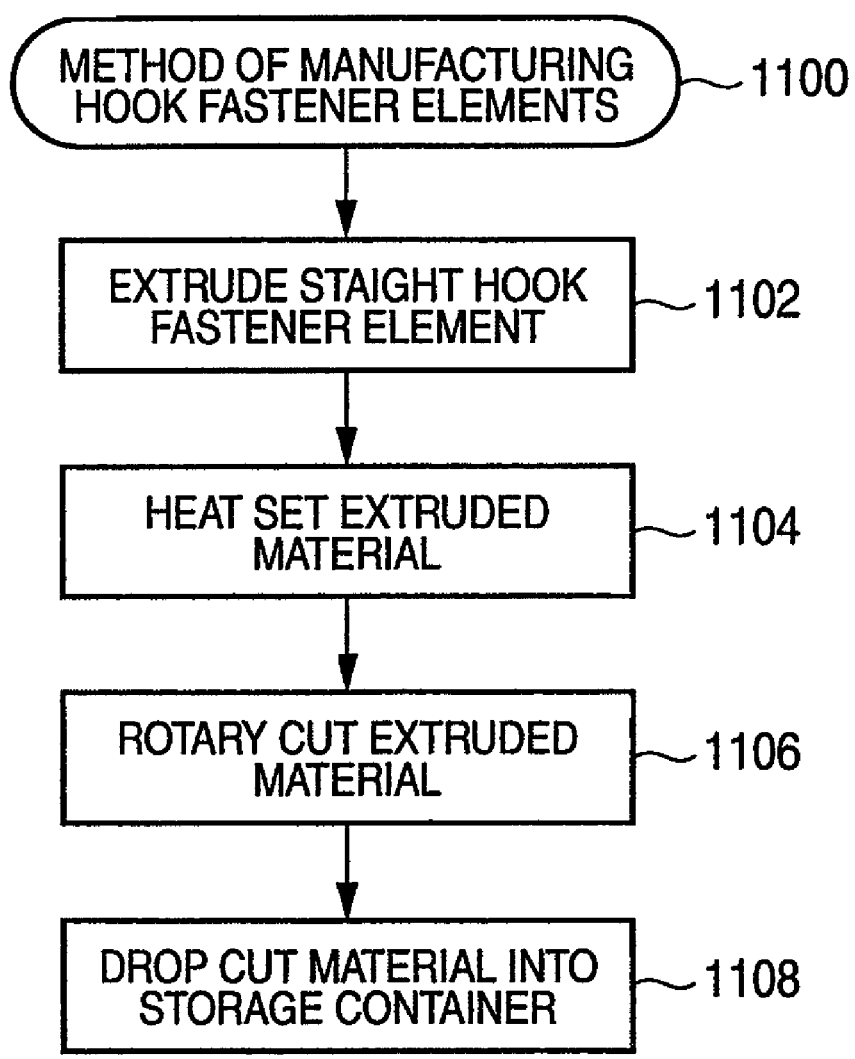

FIG. 11 illustrates a method of manufacturing the hook fastener elements according to one embodiment of the invention.

Figure 12:
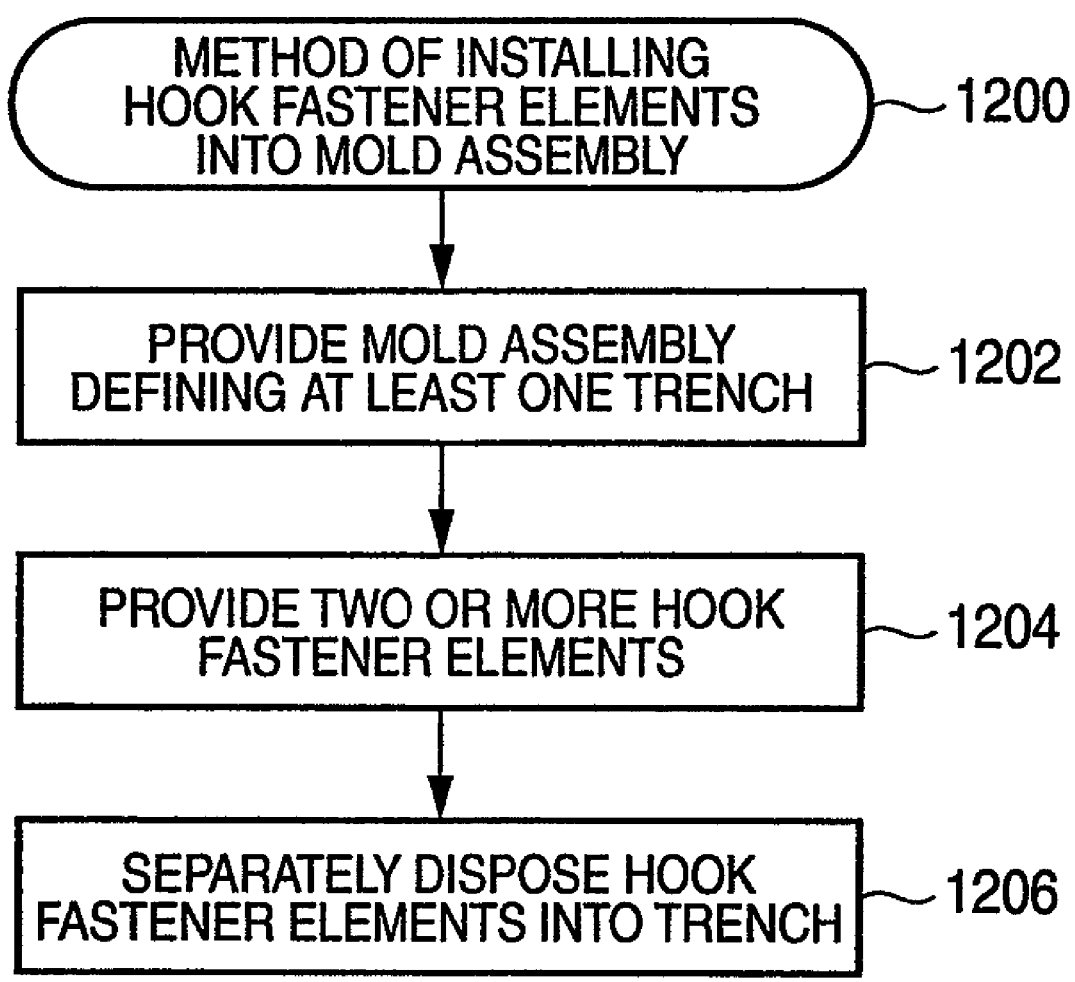

FIG. 12 illustrates a method of installing the hook fastener elements according to one embodiment of the invention.

DETAILED DESCRIPTION OF VARIOUS EMBODIMENTS OF THE INVENTION

Various embodiments of the invention are described more fully hereinafter with reference to the accompanying drawings, in which some, but not all embodiments of the invention are shown in the figures. Indeed, these inventions may be embodied in many different forms and should not be construed as limited to the embodiments set forth herein; rather, these embodiments are provided so that this disclosure will satisfy applicable legal requirements.

Brief Summary

Various embodiments of the invention provide a mold assembly system that includes a mold and two or more hook fastener elements. The mold defines at least one trench along a surface of the mold, and at least a portion of the trench is magnetic. The two or more hook fastener elements are unattached to each other and are disposed separately from each other in an end-to-end relationship on the trench. Each of the two or more hook fastener elements includes an elongated base having an upper surface, a lower surface opposite the upper surface, a first end, and a second end opposite and spaced apart from the first end. A longitudinal axis extends from the first end to the second end, and a magnetic material is disposed within the elongated base. The magnetic portion of the trench is configured to attract the two or more hook fastener elements toward the magnetic portion, substantially align the longitudinal axes of the hook fastener elements with the longitudinal axis of the trench, and hold the hook fastener elements adjacent thereto.

In various embodiments, the hook fastener elements have substantially the same length. In addition, the length may be between about 10 mm and about 50 mm. For example, in one embodiment, the length is about 25.4 millimeters, which is substantially shorter than the prior art hook fasteners. However, in various alternative embodiments, the hook fastener elements may have different lengths. For example, in various alternative embodiments, these lengths are relatively shorter than the straight hook fasteners known in the art to allow the hook fastener elements to be used in trenches having different profiles (e.g., straight or curved) and lengths.

Unlike the prior art hook fasteners described above, the hook fastener elements according to various embodiments of the invention provide a single product for substantially any mold installation. For example, the hook fastener elements according to various embodiments can be used in substantially any shaped trench, including straight trenches, curved trenches having various radii, and trenches having different lengths. In addition, because the hook fastener elements according to various embodiments are relatively smaller than the prior art hook fasteners and are substantially the same length, the processes of manufacturing and maintaining inventory of the hook fastener elements are streamlined, according to one embodiment of the invention. Specifically, according to one embodiment of a process of manufacturing the hook fastener elements, the steps of spooling, storing, de-curling, setting up the proper cut length for the hook fastener based on the length of the trench in which the hook fastener is to be used, checking the length, and counting the number of parts having that length for inventory purposes are eliminated, resulting in a more efficient and cost effective manufacturing process. In addition, by providing a substantially single sized hook fastener element that can be used in various installations, according to various embodiments, inventory is simplified and reduced for the manufacturer using the hook fastener elements in its mold assemblies. Furthermore, by using a dispensing device to store the hook fastener elements and release them into the trench according to various embodiments, operators avoid the steps of having to turn away from each mold assembly to retrieve the appropriate hook fastener and then turn back toward the mold assembly to install the hook fastener. According to one embodiment, use of the dispensing device can reduce the number of operators from two or more to one per station.

More detailed descriptions of various embodiments of the hook fastener elements are provided below.

Structure and Methods of Manufacturing a Hook Fastener Element

FIGS. 5 and 6 illustrate a hook fastener element 31 according to one embodiment of the invention. In particular, the hook fastener element 31 has an elongated base 32 that has an upper surface 33 and a lower surface 34 opposite the upper surface 33. The hook fastener element 31 also includes a first end 35 and a second end 36, and a longitudinal axis 37 extends between the first end 35 and the second end 36. A plurality of longitudinal side walls 39 extend upwardly from the upper surface 33 of the hook fastener element 31 and are disposed adjacent each longitudinal edge 40a, 40b of the upper surface 33. A plurality of hooks 38 adapted for engaging loop material extend upwardly from the upper surface 33 of the hook fastener element 31 and are disposed between the longitudinal side walls 39. The height of the longitudinal walls 39 is substantially equal to a height of the plurality of hooks 38 to prevent foam from seeping between the hooks 38 during the molding process.

According to various embodiments, the hook fastener element 31 is formed of a plastic material (e.g., polyamides, polyurethanes, polyesters, or polybutylene terephthalate (PBT)), and the base 32, hooks 38, and longitudinal side walls 39 are integrally formed during a molding process. In a particular embodiment, the strip 31 further includes a monofilament or wire having magnetic properties (e.g., iron monofilament, carbon steel wire) extending longitudinally through the base 32. This magnetic monofilament or wire attracts, aligns, and holds the hook fastener element 31 adjacent a magnetic trench, such as the magnetic trench 12 described above in relation to FIG. 1.

The lower surface 34 defines at least one fin 44, 45 adjacent each longitudinal edge 40a, 40b, respectively, of the hook fastener element 31. The fins 44, 45 serve to anchor the hook fastener elements 31 into the foam material blown into the mold assembly. The fins 44, 45 extend outwardly from each longitudinal edge 40a, 40b, respectively, in a substantially transverse direction to the longitudinal axis 37. In the embodiment shown in FIGS. 5 and 6, the fins 44 adjacent the first longitudinal edge 40a are spaced apart from each other, and the fins 45 adjacent the second longitudinal edge 40b are spaced apart from each other. Transverse axes 47 extending through each fin 44 adjacent the first longitudinal edge 40a are offset from (e.g., not coaxial with) the transverse axes 48 extending through the fins 45 adjacent the second longitudinal axis 40b. However, in the alternative embodiment shown in FIGS. 7 and 8, the transverse axes 57, 58 of the fins 64, 65 along each longitudinal edge 50a, 50b, respectively, are substantially coaxial.

According to a particular embodiment, the hook fastener elements 31 are manufactured similarly to the straight hook fastener elements described in U.S. Published Patent Application Number 2007/0240289, which is herein incorporated by reference in its entirety. In particular, as shown in FIG. 11, a method 1100 of manufacturing the hook fastener elements 31 is illustrated. Beginning at Step 1102, a straight hook fastener is extruded using steel wire and PBT. The extruded material is then heat set, as shown in Step 1104. Next, the material is rotary cut into smaller hook fastener elements 31, as shown in Step 1106, and dropped into a storage container, as shown in Step 1108. For example, in various embodiments, the hook fastener elements 31 are cut to be between about 10 mm and about 50 mm, and in one embodiment, the hook fastener elements 31 are cut to be about 25.4 millimeters long. However, the hook fastener elements 31 may be other various lengths. In other alternative embodiments, the cutting may be done using a laser cutting device. The method 1100 described above eliminates one or more of the following steps which have been used to manufacture known hook fasteners: spooling, storage prior to heat setting, de-curling, setting up a proper cut length, assembling two or more hook fastener elements adjacent each other prior to installing within the mold assembly, checking lengths of parts, and taking inventory of parts having various lengths.

Methods of Installing Hook Fastener Elements Into a Mold Assembly

FIG. 12 illustrates a method 1200 of installing a plurality of hook fastener elements 31 into a mold assembly according to one embodiment of the invention. In addition, FIG. 9 illustrates a partial plan view of a mold assembly in which a plurality of hook fastener elements 31 have been installed.

In particular, according to various embodiments, the method 1200 of installing the hook fastener elements 31 into the mold assembly begins at Step 1202 with providing a mold assembly that defines at least one trench, wherein at least a portion of the trench is magnetic. For example, in the embodiment shown in FIG. 9, a mold assembly 100 having two curved trenches 112 and three straight trenches 113 is provided, and the trenches 112, 113 include a magnetic surface that extends longitudinally along the length of each trench 112, 113. In various embodiments, the magnetic surface may be formed of magnetized iron or other ferromagnetic material, for example.

In Step 1204, two or more hook fastener elements 31, 51, such as described above in relation to FIGS. 5-8 and 11 are provided. Although Step 1204 is shown in FIG. 12 to follow Step 1202, these steps may occur simultaneously or in the reverse order (e.g., Step 1204 then Step 1202).

Next, in Step 1206, the hook fastener elements 31, 51 provided in Step 1204 are separately disposed into the trenches 112, 113 in an end-to-end relationship substantially along the length of the trench 112, 113 such that the upper surface 33 of each hook fastener element 31 is adjacent to and cofaces the lower surface of each trench 112, 113. Specifically, in one embodiment in which the hook fastener elements 31 described in relation to FIGS. 5 and 6 are provided, the hook fastener elements 31 are unattached to each other prior to being disposed within the trenches 112, 113. Thus, each hook fastener element 31 is disposed within a particular trench 112, 113 one at a time, or separately. For example, as shown in FIG. 9, a first hook fastener element 31a is disposed at one end of a curved trench 112a such that the first end 35 of the first hook fastener element 31a is disposed substantially adjacent the end of the trench 112a. A second hook fastener element 31b is disposed into the trench 112a after the first hook fastener element 31a such that the second end 36 of the first hook fastener element 31a is axially adjacent the first end 35 of the second hook fastener element 31b. Similarly, a third hook fastener element 31c is disposed into the trench 112a after the second hook fastener element 31b such that the second end 36 of the second hook fastener element 31b is axially adjacent the first end 35 of the third hook fastener element 31c. Additional hook fastener elements 31 are subsequently disposed within the trench 112a until hook fastener elements 31 arranged in an end-to-end relationship substantially cover the length of the trench 112a. Likewise, as shown in FIG. 9, multiple hook fastener elements 31 are disposed in the straight trenches 113 in the same or a similar manner.

According to one embodiment, the hook fastener elements 31 are separately disposed within the trenches 112, 113 by an operator utilizing an automated (or semi-automated) dispensing device. For example, FIG. 10 illustrates one embodiment of a dispensing device 200 that includes an outlet end 206, an inlet end 202, and a body 204 extending therebetween. The inlet end 202 receives the hook fastener elements 31, and the outlet end 206 releases or discharges the hook fastener elements 31. The operator positions the outlet end 206 of the device 200 adjacent each trench 112, 113 to be filled with hook fastener elements 31 and moves the device 200 along the length of the trench 112, 113. The magnetic surface of the trench 112, 113 pulls the hook fastener elements 31 from the outlet end 206 towards the magnetic surface, substantially aligns the longitudinal axes of the hook fastener elements 31 along the longitudinal axis of the trench 112, 113, and holds the hook fastener elements 31 adjacent thereto.

According to various embodiments, the device 200 is configured to receive input from the operator (e.g., via a trigger button) to release the hook fastener elements 31 from the outlet end 206. In an alternative embodiment, the device 200 is configured to sense the outlet end's 206 proximity to the trenches 112, 113 (e.g., via proximity sensors) and, in response to sensing the proximity, the device 200 is configured to release the hook fastener elements 31. In a further alternative embodiment, the device 200 is configured to align the outlet end 206 adjacent the trenches 112, 113. And, in yet another alternative embodiment, the hook fastener elements 31 may be manually inserted by the operator into the trenches 112, 113.

CONCLUSION

Although this invention has been described in specific detail with reference to the disclosed embodiments, it will be understood that many variations and modifications may be effected within the spirit and scope of the invention as described in the appended claims.

The invention claimed is:

1. A mold assembly system comprising:
a mold defining at least one trench along a surface of said mold, at least a portion of said trench being magnetic; and
a dispensing device having a body which comprises an inlet end configured to receive two or more hook fastener elements, wherein the hook fastener elements each have substantially the same length and are unattached, and an outlet end configured to release said hook fastener elements adjacent said trench so as to dispose said hook fastener elements separately from each other in an end-to-end relationship into said trench, wherein the dispensing device is configured to sense when the outlet end is close to the trench and to release the hook fastener elements when the outlet is close to the trench, each of said hook fastener elements comprising:

an elongated base having an upper surface, a lower surface opposite said upper surface, a first end, and a second end opposite said first end, wherein a longitudinal axis extends between said first end and said second end;

a plurality of hooks extending upwardly from said upper surface; and a magnetic material being disposed within said elongated base, wherein:

said magnetic portion of said trench is configured to attract said two or more hook fastener elements toward said magnetic portion, align said hook fastener elements, and hold said hook fastener elements adjacent thereto.

2. The mold assembly system of claim 1 wherein the magnetic material disposed within said elongated base is steel wire.

3. The mold assembly system of claim 1 wherein the magnetic material disposed within said elongated base is iron monofilament.

4. The mold assembly system of claim 1 wherein said trench is straight.

5. The mold assembly system of claim 1 wherein said trench is curved.

6. The mold assembly system of claim 1 wherein:

said mold comprises a first trench and a second trench, said first trench being straight, and said second trench being curved, said two or more hook fastener elements comprise a first hook fastener element, a second hook fastener element, a third hook fastener element, a fourth hook fastener element, a fifth hook fastener element, a sixth hook fastener element, a seventh hook fastener element, and an eighth hook fastener element each have a length that is substantially the same, said first, second, third, and fourth hook fastener elements are disposed within said first trench such that said second end of said first hook fastener element is disposed adjacent said first end of said second hook fastener element, said second end of said second hook fastener element is disposed adjacent said first end of said third hook fastener element, and said second end of said third hook fastener element is disposed adjacent said first end of said fourth hook fastener element, and said fifth, sixth, seventh, and eighth hook fastener elements are disposed within said second trench such that (1) said second end of said fifth hook fastener element is disposed adjacent said first end of said sixth hook fastener element, said second end of said sixth hook fastener element is disposed adjacent said first end of said seventh hook fastener element, and said second end of said seventh hook fastener element is disposed adjacent said first end of said eighth hook fastener element, and (2) said fifth, sixth, seventh, and eighth hook fastener elements substantially follow said curvature of said second trench.

7. A method of assembling hook fasteners in a mold assembly, said method comprising:

providing two or more hook fastener elements, each of said hook fastener elements having:

an elongated base having an upper surface, a lower surface opposite said upper surface, a first end, and a second end opposite said first end, wherein a longitudinal axis extends between said first end and said second end;

a plurality of hooks extending upwardly from said upper surface; and a magnetic material being disposed within said elongated base;

providing a mold assembly defining at least one trench, at least a portion of said trench being magnetic; and separately disposing said two or more hook fastener elements into said at least one trench, said two or more hook fastener elements being disposed in an end-to-end relationship, wherein:

said two or more hook fastener elements are unattached to each other prior to being disposed within said trench, and said step of separately disposing said two or more hook fastener elements into said trench comprises:

receiving the two or more unattached hook fastener elements in the inlet end of a dispensing device, and disposing an outlet end of the dispensing device adjacent said trench moving the dispensing device along a length of the trench;

pulling the hook fastener elements from the outlet end of the dispensing device towards the magnetic portion of the trench, wherein the hook fastener elements are pulled from the outlet end of the dispensing device by a magnetic force of the magnetic portion of the trench; and substantially aligning longitudinal axes of the hook fastener elements along a longitudinal axis of the trench.

8. The method of claim 7 wherein the step of providing said two or more hook fastener elements comprises rotary cutting a straight hook fastener element into two or more separate hook fastener elements.

9. The method of claim 7 wherein the step of providing said two or more hook fastener elements comprises the steps of:

extruding a magnetic material and a plastic material;

forming an upper and lower surface of said extruded material, said upper and lower surface of said extruded material substantially corresponding to a shape of said upper and lower surface, respectively, of each of said two or more hook fastener elements;

heat setting said extruded materials; and cutting said extruded materials into separate, unattached hook fastener elements, wherein said hook fastener elements have substantially the same length.

10. The method of claim 7 wherein an operator moves said outlet end adjacent said trench and actuates said dispensing device.

* * * * *